US011487426B2

(12) United States Patent
Lee et al.

(10) Patent No.: US 11,487,426 B2
(45) Date of Patent: *Nov. 1, 2022

(54) APPARATUS AND METHOD FOR CURSOR CONTROL AND TEXT SELECTION AND EDITING BASED ON GESTURE-BASED TOUCH INPUTS RECEIVED IN A VIRTUAL KEYBOARD DISPLAY AREA

(71) Applicant: Samsung Electronics Co., Ltd., Suwon-si (KR)

(72) Inventors: Yo-Han Lee, Seoul (KR); Se-Jun Song, Seoul (KR); Da-Som Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 27 days.

This patent is subject to a terminal disclaimer.

(21) Appl. No.: 16/352,251

(22) Filed: Mar. 13, 2019

(65) Prior Publication Data

US 2019/0212914 A1 Jul. 11, 2019

Related U.S. Application Data

(63) Continuation of application No. 14/221,605, filed on Mar. 21, 2014, now Pat. No. 10,275,151.

(30) Foreign Application Priority Data

Apr. 10, 2013 (KR) .................. 10-2013-0039016

(51) Int. Cl.
*G06F 3/048* (2013.01)
*G06F 3/04886* (2022.01)
(Continued)

(52) U.S. Cl.
CPC ...... *G06F 3/04886* (2013.01); *G06F 3/04812* (2013.01); *G06F 3/04883* (2013.01)

(58) Field of Classification Search
CPC . G06F 3/00; G06F 3/048; G06F 3/041; G06F 3/04886; G06F 3/04812; G06F 3/04883
See application file for complete search history.

(56) References Cited

U.S. PATENT DOCUMENTS 8,650,508 B2    2/2014  Lim
8,904,309 B1   12/2014  Zhai et al.
(Continued)

FOREIGN PATENT DOCUMENTS

EP       2 407 892 A1   1/2012
KR   10-2011-0127752 A  11/2011
KR   10-2011-0133174 A  12/2011

OTHER PUBLICATIONS

Korean Office Action dated Jun. 19, 2019, issued in Korean Patent Application No. 10-2013-0039016.

*Primary Examiner* — Jennifer N Welch
*Assistant Examiner* — Reji Kartholy
(74) *Attorney, Agent, or Firm* — Jefferson IP Law, LLP (57) ABSTRACT

An apparatus and method of editing text in a mobile terminal include a display unit, configured to display a text display area, a touch sensitive keypad display area, at least one text character in the text display area, and a cursor in the text display area; and at least one processor, configured to detect a first gesture in a touch input in the touch sensitive keypad display area, and control moving, upon detecting the first gesture, the cursor in the text display area, according to the touch input in the touch sensitive keypad display area. The first gesture includes a touch of a point in the touch sensitive keypad display area where no key is displayed.

18 Claims, 6 Drawing Sheets

(51) Int. Cl.
*G06F 3/04883* (2022.01)
*G06F 3/04812* (2022.01)

(56) References Cited

U.S. PATENT DOCUMENTS

| | | | |
|---|---|---|---|
| 9,147,275 B1* | 9/2015 | Hyde-Moyer | G06V 30/248 |
| 2007/0296707 A1* | 12/2007 | Kang | G06F 1/1616 |
| | | | 345/172 |
| 2008/0316183 A1* | 12/2008 | Westerman | G06F 3/04883 |
| | | | 345/173 |
| 2009/0228842 A1 | 9/2009 | Westerman et al. | |
| 2010/0013852 A1 | 1/2010 | Liu | |
| 2010/0235726 A1 | 9/2010 | Ording et al. | |
| 2011/0231789 A1 | 9/2011 | Bukurak et al. | |
| 2011/0231796 A1* | 9/2011 | Vigil | G06F 3/04883 |
| | | | 715/810 |
| 2011/0239153 A1 | 9/2011 | Carter et al. | |
| 2011/0310026 A1 | 12/2011 | Davis et al. | |
| 2011/0320978 A1 | 12/2011 | Horodezky et al. | |
| 2012/0192093 A1 | 7/2012 | Migos et al. | |
| 2012/0229493 A1 | 9/2012 | Kim et al. | |
| 2012/0306772 A1 | 12/2012 | Tan et al. | |
| 2013/0091583 A1 | 4/2013 | Karroumi et al. | |
| 2013/0113720 A1* | 5/2013 | Van Eerd | G06F 3/04817 |
| | | | 345/173 |
| 2013/0239010 A1 | 9/2013 | Lim et al. | |
| 2013/0285935 A1 | 10/2013 | Thorsander | |
| 2013/0342452 A1* | 12/2013 | Kuo | G06F 3/04886 |
| | | | 345/157 |
| 2014/0035824 A1* | 2/2014 | Bernstein | G06F 3/04886 |
| | | | 345/172 |
| 2014/0078063 A1 | 3/2014 | Bathiche et al. | |
| 2014/0109016 A1* | 4/2014 | Ouyang | G06F 40/166 |
| | | | 715/856 |
| 2014/0145945 A1* | 5/2014 | Shin | G06F 40/166 |
| | | | 345/157 |
| 2014/0223382 A1 | 8/2014 | Hicks et al. | |
| 2014/0282139 A1* | 9/2014 | Balogh | G06F 3/04883 |
| | | | 715/765 |
| 2015/0074578 A1* | 3/2015 | Liang | G06F 3/04886 |
| | | | 715/773 |
| 2015/0277748 A1* | 10/2015 | Shin | G06F 3/041 |
| | | | 715/773 |

* cited by examiner

APPARATUS AND METHOD FOR CURSOR CONTROL AND TEXT SELECTION AND EDITING BASED ON GESTURE-BASED TOUCH INPUTS RECEIVED IN A VIRTUAL KEYBOARD DISPLAY AREA

CROSS-REFERENCE TO RELATED APPLICATION(S)

This application is a continuation application of prior application Ser. No. 14/221,605, filed on Mar. 21, 2014, which was based on and claimed priority under 35 U.S.C § 119(a) of a Korean patent application number 10-2013-0039016, filed on Apr. 10, 2013, in the Korean Intellectual Property Office, the entire disclosure of each being included herein by reference.

TECHNICAL FIELD

The present disclosure relates to a mobile terminal. More particularly, the present disclosure relates to an apparatus and method for editing a message in a mobile terminal.

BACKGROUND

Mobile terminals, such as a smart phone, a tablet computer, and the like, provide users with various useful functions through various applications. Accordingly, the mobile terminal has evolved to a device capable of using various types of information in addition to a voice call function through provision of various functions. Particularly, the mobile terminal provides a message function of writing a message including letters selected by a user and transmitting the message to another terminal.

If a user touches a specific location in a text display area of a mobile terminal of the related art when inputting letters through a keypad, the mobile terminal providing the message function moves a cursor to the touched location.

However, if the user holds the mobile terminal of the related art in a position for easily inputting letters on the keypad, the user must change the position in order to select the text display area. Furthermore, in order to select a specific location in the text display area, the user must touch an exact desired location between letters, which makes it difficult to move the cursor to the desired location.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for editing a message by moving a cursor through a keypad display area in a mobile terminal.

Another aspect of the present disclosure is to provide an apparatus and method for editing a message by adjusting a size of a selection area through a keypad display area in a mobile terminal.

In accordance with an aspect of the present disclosure, an apparatus of editing a message in a mobile terminal is provided. The apparatus includes a display unit configured to display a text display area and a keypad display area, and to display at least one letter and a cursor in the text display area, and a controller configured to move the cursor according to a first gesture performed in the keypad display area.

In accordance with another aspect of the present disclosure, a method of editing a message in a mobile terminal is provided. The method includes displaying a text display area and a keypad display area, displaying at least one letter and a cursor in the text display area, and moving the cursor according to a first gesture performed in the keypad display area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this disclosure, a mobile terminal is a portable electronic device, and may be a video phone, a mobile phone, a smart phone, an International Mobile Telecommunication 2000 (IMT-2000), a Wideband Code Division Multiple Access (WCDMA) terminal, a Universal Mobile Telecommunication Service (UMTS) terminal, a Personal Digital Assistant (PDA), a Portable Multimedia Player (PMP), a Digital Multimedia Broadcasting (DMB) terminal, an E-Book reader, a notebook computer, a tablet computer, or a digital camera.

Figure 1:
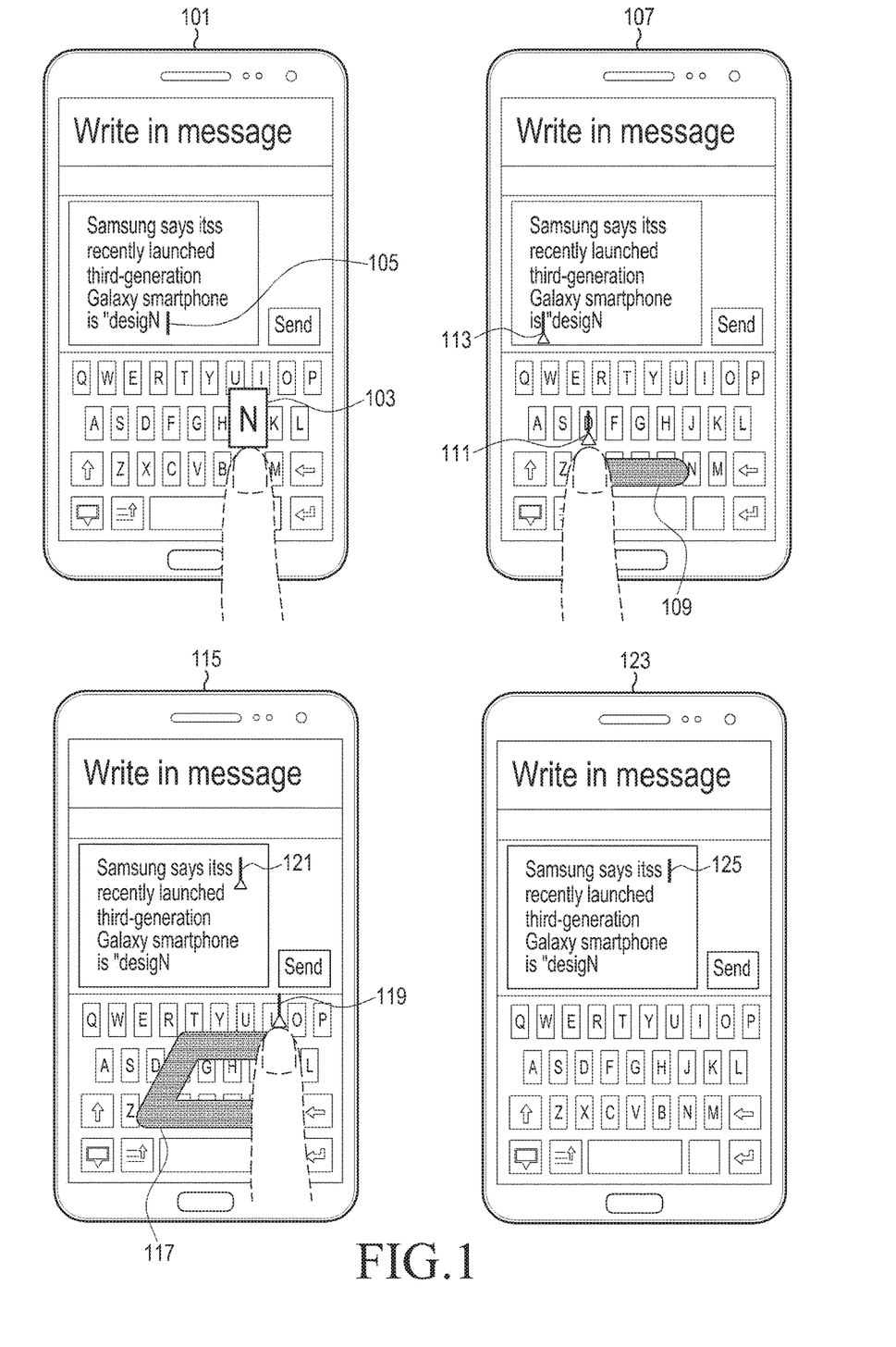
FIG. 1 illustrates screens on which a cursor moves according to a first embodiment of the present disclosure.

FIG. 1 illustrates screens on which a cursor moves in a mobile terminal according to a first embodiment of the present disclosure.

Referring to FIG. 1, as illustrated on a screen 101, if an input for writing a message is received from a user, the mobile terminal displays a text display area and a keypad display area. The keypad display area is an area in which a keypad is displayed, and the text display area is an area in which a cursor and a letter, selected by the user from among at least one letter included in the displayed keypad, are displayed. The cursor is an indicator indicating a location at which the letter selected by the user is displayed in the text display area.

If a specific letter among letters included in the displayed keypad is selected by the user, the mobile terminal displays the selected specific letter at the location of the cursor displayed in the text display area, and places the cursor immediately after the displayed specific letter. For example, if a letter "N" 103 among letters included in the keypad is single touched by the user, the mobile terminal may display the letter "N" in the text display area, and place the cursor at a first location 105 just adjacent to "N."

As illustrated on screens 107 and 115, if a first gesture (for example, a touch-and-drag operation) is performed in the keypad display area by the user, the mobile terminal moves the cursor displayed in the text display area according to an input location changed by the first gesture. At this time, the mobile terminal may display an icon representing that the first gesture is a gesture for moving the cursor, in the keypad display area, along a trace of the first gesture, until the first gesture terminates.

For example, if a touch-and-drag operation 109 of touching and then dragging in a left direction is performed, the mobile terminal may move the cursor from the first location 105 to a corresponding second location 113 according to an input location changed by the touch-and-drag operation 109. Also, the mobile terminal may display an icon 111 above, or to the left or right of, the input location changed by the touch-and-drag operation 109, and may display a corresponding icon at the second location 113. If a drag operation 117 of dragging in an upper-right diagonal direction and then dragging in a right direction is performed, the mobile terminal may move the cursor from the second location 113 to a corresponding third location 121 according to an input location changed by the drag operation 117. At this time, the mobile terminal may display an icon 119 above, or to the left or right of, current coordinates at which the drag operation 117 is performed, and may display a corresponding icon at the third location 121.

Then, if the first gesture has terminated, the mobile terminal stops moving the cursor, and displays the cursor moved by the first gesture, as illustrated in a screen 123. For example, if the drag operation 117 has terminated at a location to which the third location 121 corresponds, the mobile terminal may display the cursor at the corresponding third location 121. After the operation is completed, the icons 111 and 119 are no longer displayed, and the mobile terminal may return the displaying of the cursor 125 to a standard mode, as illustrated in screen 123.

Figure 2:
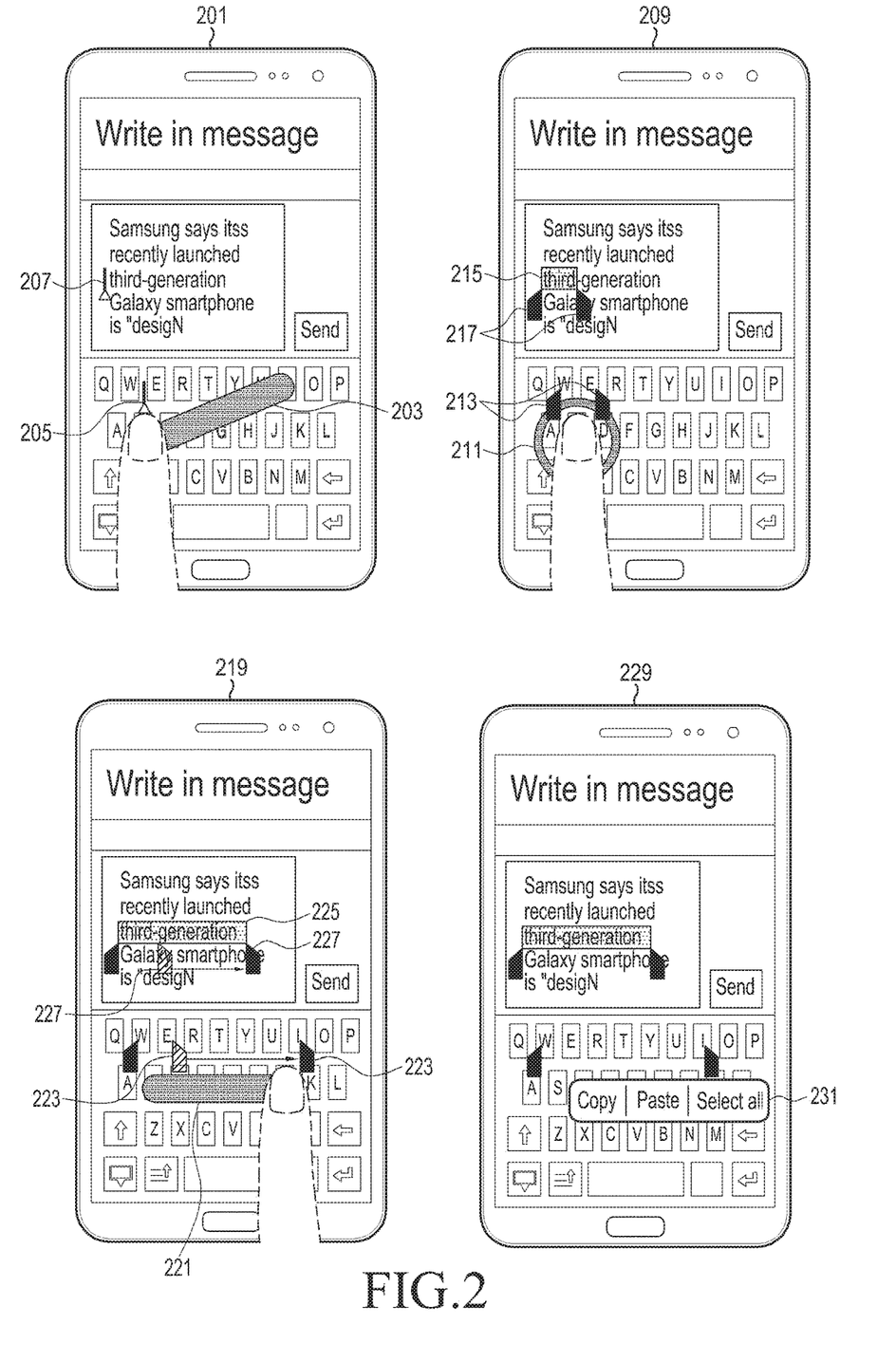
FIG. 2 illustrates screens on which area indicators are controlled according to a second embodiment of the present disclosure.

FIG. 2 illustrates screens on which area indicators are controlled according to a second embodiment of the present disclosure.

Referring to FIGS. 1 and 2, as illustrated on a screen 201, if a second gesture (for example, a touch-and-drag operation) is performed on the keypad display area, the mobile terminal moves the cursor displayed in the text display area according to an input location changed by the second gesture.

For example, if a first touch-and-drag operation 203 of touching a first specific location and then dragging in a lower-left diagonal direction is performed by the user, the mobile terminal may move the cursor from the third location 121 to a fourth location 207 according to an input location changed by the first touch-and-drag operation 203. At this time, the mobile terminal may display an icon 205 in the keypad display area along a path of the first touch-and-drag operation 203. Here, the icon 205 is an icon representing that the first touch-and-drag operation 203 is a gesture for moving the cursor. A corresponding icon may be displayed at the corresponding fourth location 207 of the cursor.

As illustrated on a screen 209, if a second gesture (for example, a touch-and-hold operation) 211 is performed in the keypad display area by the user, the mobile terminal highlights a selection area including at least one word 215 corresponding to a location at which the second gesture 211 is performed among a plurality of words included in the text display area, and displays first area indicators 217 indicating start and end points of the selection area. Here, "hold" means a gesture in which touching a specific location is maintained for a threshold time period. At this time, the mobile terminal may also display second area indicators 213 in the keypad display area according to the location at which the second gesture 211 is performed.

For example, if a touch-and-hold operation 211 of touching a specific location and then holding is performed by the user, the mobile terminal may highlight a selection area 215 corresponding to a location at which the touch-and-hold operation 211 is performed, display first area indicators 217 indicating start and end points of the selection area 215, and display second area indicators 213 in the keypad display area according to the location at which the touch-and-hold operation 211 is performed.

Thereafter, as illustrated on a screen 219, if a third gesture (for example, a drag operation) 221 following the second gesture 211 is performed in the keypad display area by the user, the mobile terminal moves one of the second area indicators 213 according to an input location changed by the third gesture 221. The mobile terminal moves the first area indicator corresponding to the moved second area indicator according to the location of the moved second area indicator, and highlights a selection area changed by the movement of the first area indicator.

For example, if a drag operation 221 of dragging in a right direction is performed following the touch-and-hold operation 211, the mobile terminal may move the second area indicator 223 located in the movement direction of the drag operation 221 among the second area indicators 213 by the movement distance of the drag operation 221. The mobile terminal may move the first area indicator 227 corresponding to the moved second area indicator 223, and highlight a selection area 225 changed by the movement of the first area indicator 227.

As illustrated on a screen 229, if the third gesture (for example, the drag operation) 221 has terminated, the mobile terminal may display a text editing menu 231. The text editing menu 231 is a menu for editing at least one letter included in the selection area 225, and may include various menus, such as copy, paste, select all, etc. For example, when the drag operation 221 has terminated, the mobile terminal may display the text editing menu 231 in the text display area.

Figure 3:
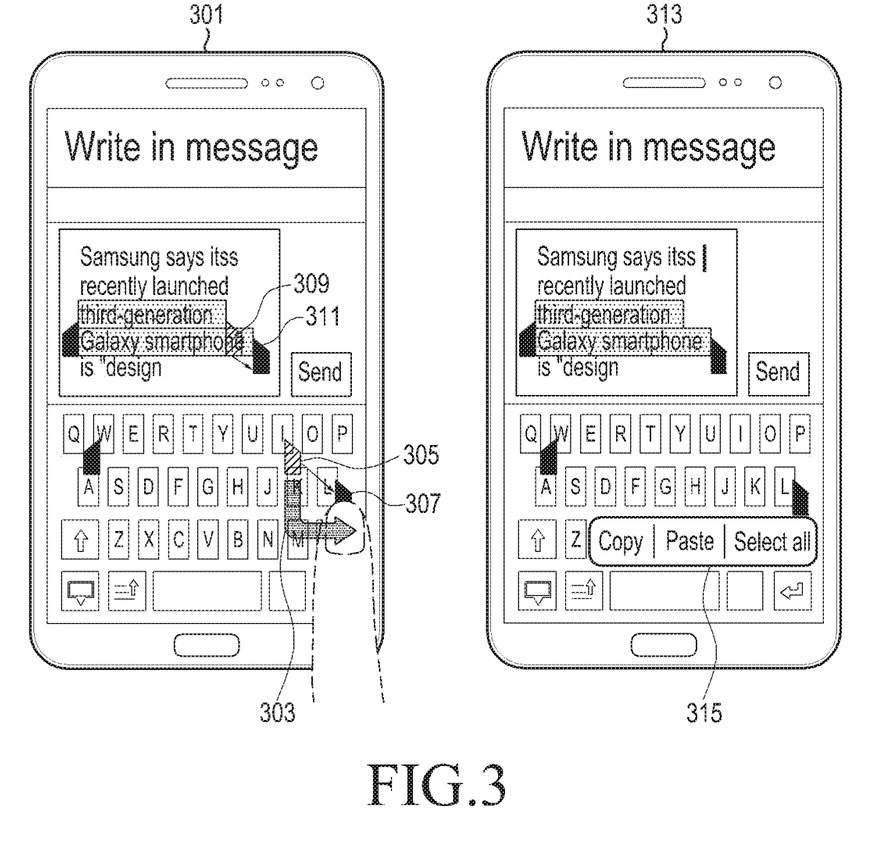
FIG. 3 illustrates screens on which area indicators are controlled according to a third embodiment of the present disclosure.

FIG. 3 illustrates screens on which area indicators are controlled according to a third embodiment of the present disclosure.

Referring to FIG. 3, as illustrated on a screen 301, if at least one of the second area indicators is dragged by the user, the mobile terminal moves the corresponding second area indicator according to the current location at which the drag operation is performed. The mobile terminal moves the first area indicator corresponding to the dragged second area indicator among the first area indicators in consideration of the location of the dragged second area indicator, and highlights a selection area changed by the movement of the first area indicator.

For example, if one of the second area indicators is dragged in operation 313 from a first location 305 to a second location 307, the mobile terminal may move the first area indicator corresponding to the dragged second area indicator from a third location 309 to a fourth location 311, and highlight a selection area changed by the movement of the first area indicator.

If dragging one of the second area indicators has terminated, the mobile terminal may display a text editing menu 315. For example, as illustrated in screen 313, if operation 303 of dragging the second area indicator has terminated, the mobile terminal may display a text editing menu 315 in the keypad display area.

Figure 4:
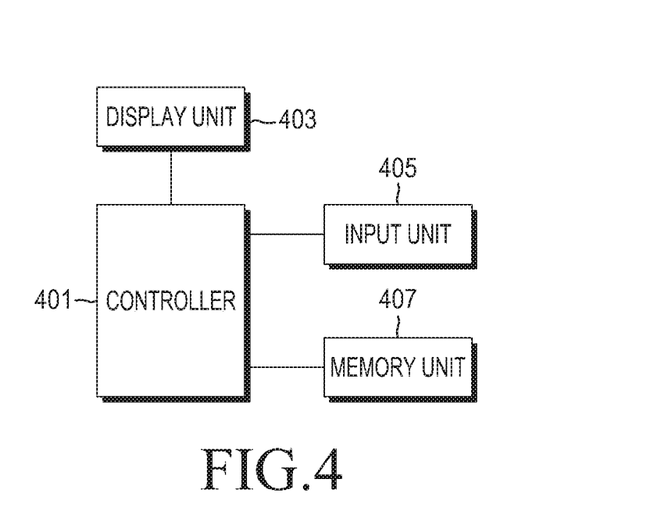
FIG. 4 is a block diagram illustrating a mobile terminal according to an embodiment of the present disclosure.

FIG. 4 is a block diagram illustrating a mobile terminal according to an embodiment of the present disclosure. The following description will be given with reference to FIGS. 1 to 4.

Referring to FIG. 4, the mobile terminal includes a controller 401, a display unit 403, an input unit 405, and a memory unit 407.

The input unit 405 includes keys for allowing a user to input numerical and text information, and functional keys for setting various functions. The display unit 403 displays an image signal as a screen, and displays data controlled to be output by the controller 401. If the display unit 403 is implemented as a touch screen, the input unit 405 may include a minimum number of keys, and the display unit 403 may provide a part of the key input functions of the input unit 405.

The memory unit 407 may include a program memory and a data memory (not shown). The program memory may store a booting and Operating System (OS) for controlling the general operations of the mobile terminal, and the data memory may store various kinds of data created or received when the mobile terminal operates.

The controller 401 performs a function of controlling the entire operation of the mobile terminal. Particularly, the controller 401 determines whether an input for writing a message is received from a user through the input unit 405. If it is determined that the input for writing a message is received, the controller 401 enters a text input mode. The text input mode is a mode of receiving at least one letter selected by a user and creating a message including the selected at least one letter.

Also, the controller 401 displays a text display area and a keypad display area on the display unit 403, and corresponds coordinates of the text display area to coordinates of the keypad display area, respectively. The keypad display area is an area in which a keypad is displayed, and the text display area is an area in which a cursor and a letter selected by a user from among at least one letter included in the displayed keypad are displayed. The text display area and the keypad display area may have predetermined sizes, respectively. The cursor is an indicator indicating a location at which the letter selected by the user in the text display area is displayed.

The controller 401 corresponds the coordinates of the text display area to the coordinates of the keypad display area in consideration of a size ratio between the text display area and the keypad display area. For example, if a size ratio between the test display area and the keypad display area is 1:1, the controller 401 may 1:1 correspond the coordinates of the text display area to the coordinates of the keypad display area. As another example, if a size ratio between the text display area and the keypad display area is 2:1, the controller 401 may 2:1 correspond the coordinates of the text display area to the coordinates of the keypad display area.

The controller 401 determines whether a letter among a plurality of letters included in the displayed keypad is selected by the user through the input unit 405. If a specific letter is selected, the controller 401 displays the selected specific letter at the location of a cursor displayed in the text display area, and places the cursor next to the displayed specific letter. For example, if a letter "N" among at least one letter included in the keypad is single touched by the user, the controller 401 displays "N" in the text display area and places a cursor 105 just adjacent to "N," as illustrated on the screen 101 of FIG. 1.

The controller 401 determines whether a first gesture (for example, a touch-and-drag gesture) is performed in the keypad display area by the user.

If it is determined that the first gesture is performed, the controller 401 moves the cursor displayed in the text display area according to an input location changed by the first gesture. In more detail, the controller detects coordinates of the text display area, corresponding to current coordinates at which the first gesture is performed, and moves the cursor to the detected coordinates of the text display area.

At this time, the controller 401 may display an icon representing that the first gesture is a gesture for moving the cursor, in the keypad display area, along a path of the first gesture, until the first gesture terminates.

For example, if a touch-and-drag operation 109 of touching and then dragging in a left direction is performed, the controller 401 may detect coordinates of the text display area, corresponding to current coordinates of a location at which the touch-and-drag operation 109 is performed, as illustrated on the screen 107 of FIG. 1. If the detected coordinates are coordinates of the second location 113, the controller 401 may move the cursor from the first location 105 to the second location 113. The controller 401 may display the icon 111 above, or to the left or right of, the current location at which the touch-and-drag operation 109 is performed.

If the first gesture has terminated, the controller 401 stops moving the cursor, and displays the cursor moved by the first gesture. For example, if a dragging operation 117 has terminated at a specific location 119, the controller 401 may detect coordinates of a third location 121 corresponding to coordinates of the specific location 119, and display the cursor at the third location 121.

The controller 401 determines whether a second gesture (for example, a touch-and-hold operation) is performed by the user through the input unit 405.

If it is determined that the second gesture is performed, the controller 401 switches a text input mode to a text selection mode. The text selection mode is a mode of selecting at least one letter displayed on the text display area and editing the selected at least one letter.

The controller 401 highlights a selection area corresponding to the input location of the second gesture, and displays first area indicators indicating start and end points of the selection area. In detail, the controller 401 detects coordinates of the text display area, corresponding to current coordinates of the second gesture, designates a selection area including at least one letter located on the detected coordinates, highlights the designated selection area, and displays first area indicators for the designated selection area.

The controller 401 displays second area indicators in the keypad display area according to the input location of the second gesture. In more detail, the controller 401 detects the current coordinates of the second gesture, displays second area indicators spaced by a distance between the first area indicators according to the detected current coordinates of the second gesture, and corresponds the first area indicators to the second area indicators.

For example, if a touch-and-hold operation 211 of touching a specific location and then holding is performed by the user, as illustrated on the screen 209 of FIG. 2, the controller 401 may designate a selection area 215 corresponding to coordinates at which the touch-and-hold operation 211 is performed, highlight the designated selection area 215, and display first area indicators 217. Also, the controller 401 may display second area indicators 213 spaced by a distance between the first area indicators 217 in the keypad display area according to the coordinates at which the touch-and-hold operation 211 is performed, and correspond the first area indicators 217 to the second area indicators 213.

The controller 401 displays a text editing menu. The text editing menu is a menu for editing at least one letter included in the selection area 225, and may include various menus, such as copy, paste, select all, etc.

Thereafter, the controller 401 determines whether a third gesture (for example, a drag operation) following the second gesture is performed in the keypad display area by the user through the input unit 405. If it is determined that the third gesture is performed, the controller 401 moves one of the second area indicators according to an input location changed by the third gesture. The controller 401 moves the first area indicator corresponding to the moved second area indicator among the first area indicators according to the location of the moved second area indicator, and highlights a selection area changed by the movement of the first area indicator.

In more detail, the controller 401 detects current coordinates of the third gesture, selects the second area indicator located closest to the current coordinates of the third gesture between the second area indicators, and moves the corresponding second area indicator according to the current coordinates of the third gesture. The controller 401 detects coordinates of the moved second area indicator, detects coordinates of the text display area corresponding to the coordinates of the second area indicator, moves the first area indicator corresponding to the moved second area indicator to the detected coordinates of the text display area, re-designates a selection area according to the movement of the first area indicator, and highlights the re-designated selection area.

For example, if a drag gesture 221 of dragging in a right direction, following the touch-and-hold operation 211, is performed by the user, as illustrated on the screen 219 of FIG. 2, the controller 401 may move the second area indicator 223 located in the movement direction of the drag operation 221 among the second area indicators 213 by the movement distance of the drag operation 221. The controller 401 may detect coordinates of the moved second area indicator 223, move the first area indicator 227 corresponding to the second area indicator 223 to coordinates of the text display area, corresponding to the coordinates of the second area indicator 223, and highlight a selection area 225 changed by the movement of the first area indicator 227.

The controller 401 determines whether the third gesture (for example, a drag operation) has terminated by the user through the input unit 405.

If it is determined that the third gesture has terminated, the controller 401 displays a text editing menu. For example, if the touch-and-drag operation 221 has terminated, the controller 401 may display a text editing menu 231 in the keypad display area, as illustrated on the screen 229 of FIG. 2.

The controller 401 determines whether one of the second area indicators 213 is touched and dragged by the user.

If a drag operation of dragging one of the second indicators 213 is performed, the controller 401 moves the dragged second indicator according to a location at which the drag operation is currently performed. The controller 401 moves the first area indicator corresponding to the dragged second area indicator among the first area indicators in consideration of the location of the dragged second area indicator, and highlights a selection area changed by the movement of the first area indicator.

For example, referring to FIG. 3, if one of the second area indicators is dragged in an operation 303 from the first location 305 to the second location 307, the controller 401 may move the first area indicator corresponding to the dragged second area indicator from the third location 309 to the fourth location 311, and highlight a selection area changed by the movement of the first area indicator.

If dragging one of the second area indicators has terminated, the controller 401 displays a text editing menu. For example, if operation 303 of dragging the second area indicator has terminated, the controller 401 may display a text editing menu 315 in the keypad display area.

Figure 5A:
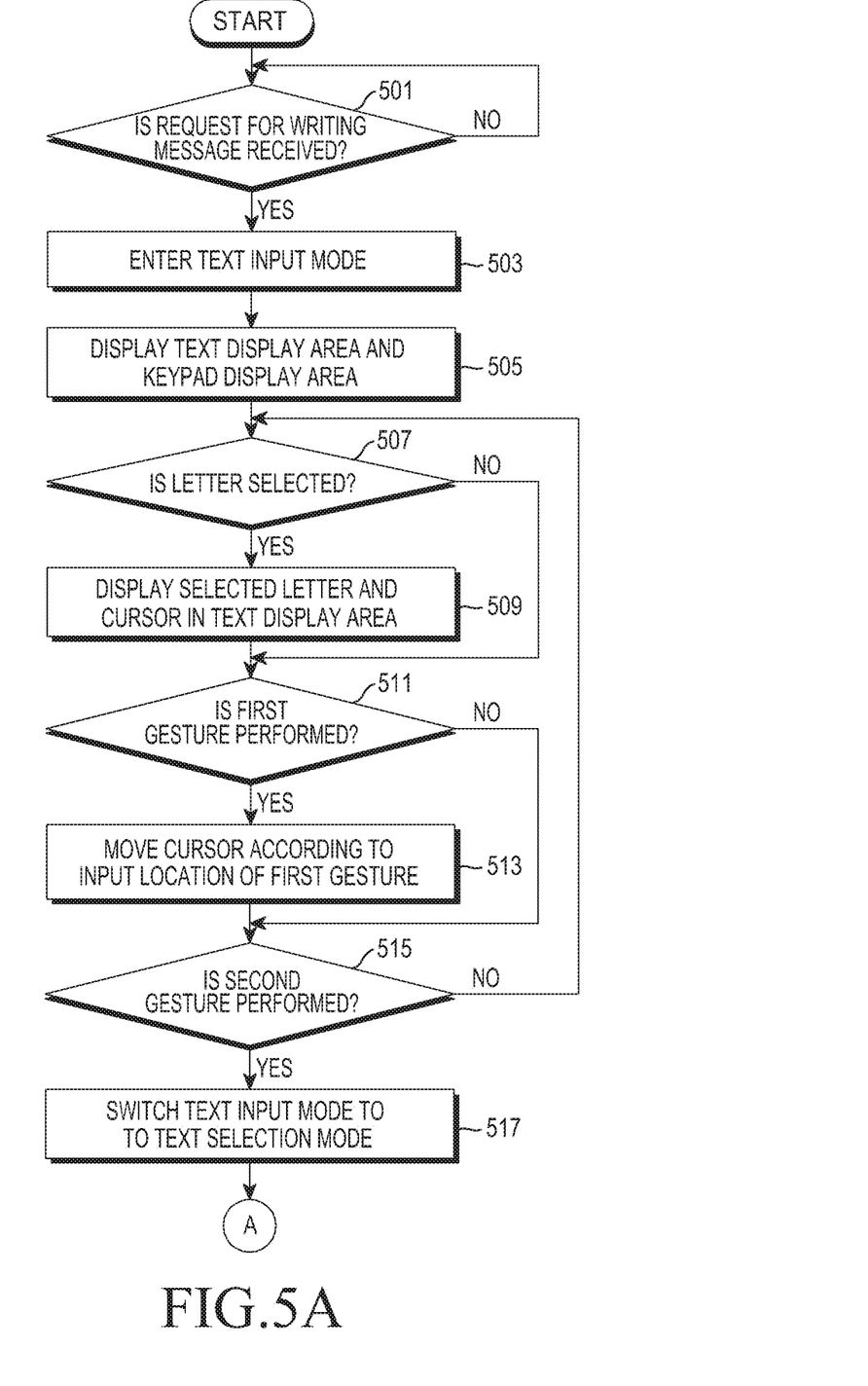
FIGS. 5A to 5C are flowcharts illustrating a method for editing a message in a mobile terminal according to an embodiment of the present disclosure.
Figure 5B:
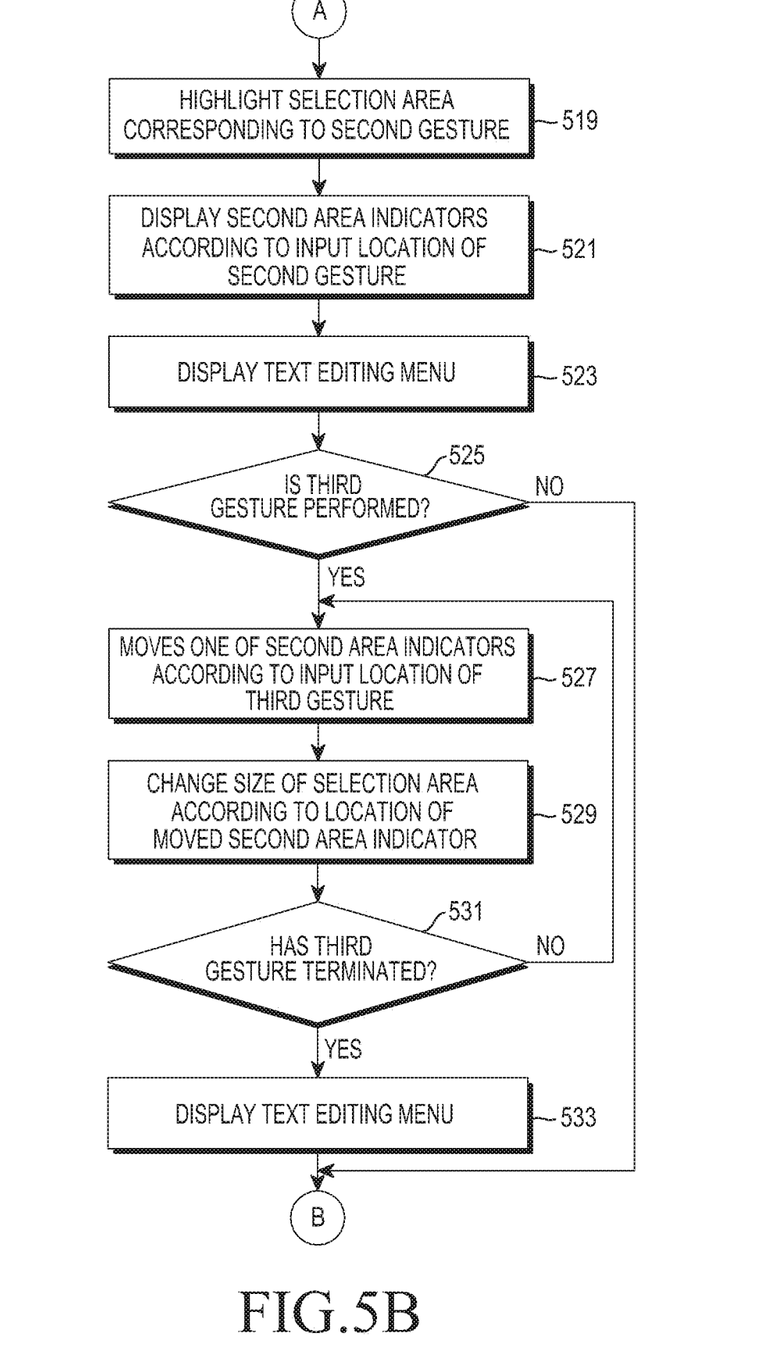
Figure 5C:
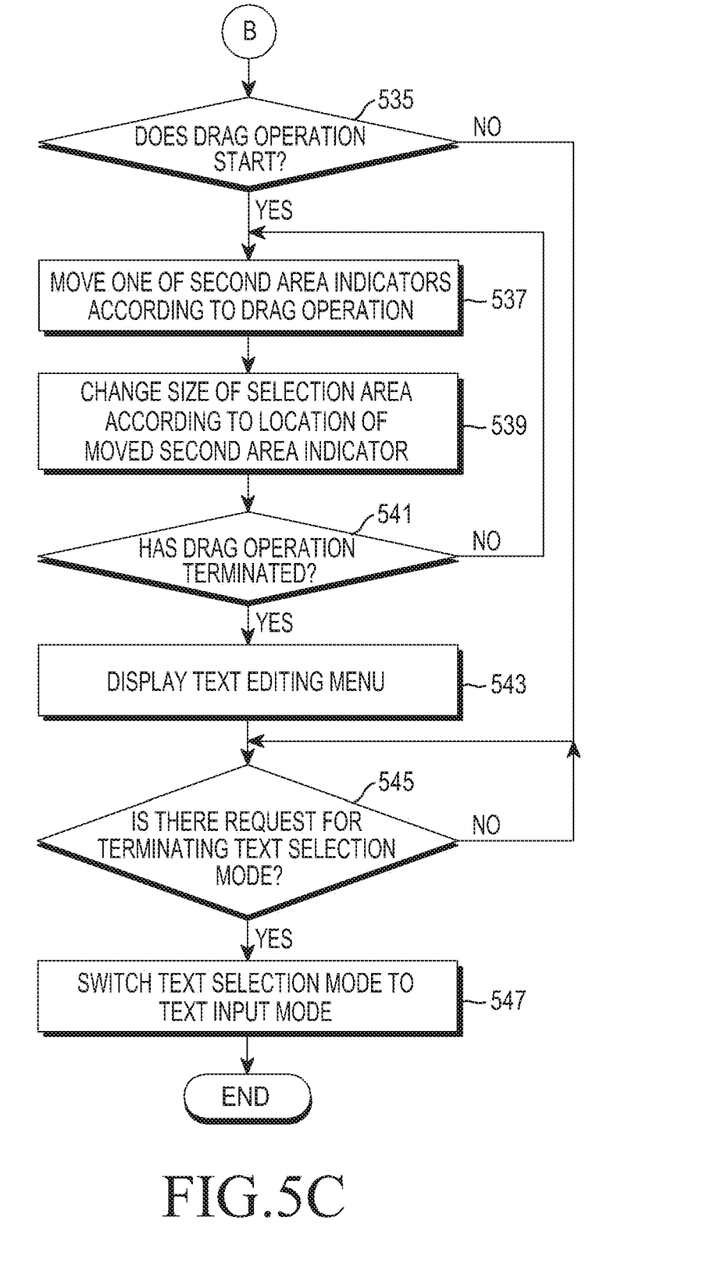

FIGS. 5A to 5C are flowcharts illustrating a method for editing a message in a mobile terminal according to an embodiment of the present disclosure. The following description will be given with reference to FIGS. 1 through 5A to 5C.

Referring to FIGS. 5A to 5C, in operation 501, the controller 401 determines whether an input for writing a message is received from a user. If it is determined that the input for writing a message is received, the controller 401 proceeds to operation 503, and otherwise, the controller 401 repeatedly performs operation 501.

In operation 503, the controller 401 enters a text input mode, and then proceeds to operation 505. The text input mode is a mode of receiving at least one letter selected by a user and creating a message including the selected at least one letter.

In operation 505, the controller 401 displays a text display area and a keypad display area, corresponds coordinates of the text display area to coordinates of the keypad display area, respectively, and then proceeds to operation 507. The keypad display area is an area in which a keypad is displayed, and the text display area is an area in which a cursor and a letter selected by the user from among at least one letter included in the displayed keypad are displayed. The text display area and the keypad display area may have predetermined sizes, respectively. The cursor is an indicator indicating a location at which a letter selected by the user in the text display area is displayed.

The controller 401 corresponds the coordinates of the text display area to the coordinates of the keypad display area, respectively, in consideration of a size ratio between the text display area and the keypad display area. For example, if a size ratio between the test display area and the keypad display area is 1:1, the controller 401 may 1:1 correspond the coordinates of the text display area to the coordinates of the keypad display area, respectively. As another example, if a size ratio between the text display area and the keypad display area is 2:1, the controller 401 may 2:1 correspond the coordinates of the text display area to the coordinates of the keypad display area, respectively.

In operation 507, the controller 401 determines whether a letter among a plurality of letters included in the displayed keypad is selected by the user. If a specific letter is selected, the controller 401 proceeds to operation 509, and otherwise, the controller 401 proceeds to operation 511.

In operation 509, the controller 401 displays the selected specific letter at the location of a cursor displayed in the text display area, and places the cursor next to the displayed specific letter. For example, if a letter "N" among at least one letter included in the keypad is single touched by the user, the controller 401 displays "N" in the text display area and places a cursor 105 just adjacent to "N," as illustrated on the screen 101 of FIG. 1.

In operation 511, the controller 401 determines whether a first gesture (for example, a touch-and-drag gesture) is performed in the keypad display area by the user. If it is determined that the first gesture is performed, the controller 401 proceeds to operation 513, and otherwise, the controller 401 proceeds to operation 515.

In operation 513, the controller 401 moves the cursor displayed in the text display area according to an input location changed by the first gesture, and then proceeds to operation 515. In more detail, the controller 401 detects coordinates of the text display area, corresponding to current coordinates at which the first gesture is performed, and moves the cursor to the detected coordinates.

The controller 401 may display an icon representing that the first gesture is a gesture for moving the cursor, in the keypad display area, along a trace of the first gesture, until the first gesture terminates.

For example, if a touch-and-drag operation 109 of touching and then dragging in a left direction is performed, the controller 401 may detect coordinates of the text display area, corresponding to current coordinates at which the touch-and-drag operation 109 is performed, as illustrated on the screen 107 of FIG. 1. If the detected coordinates are coordinates of the second location 113, the controller 401 may move the cursor from the first location 105 to the second location 113. At this time, the controller 401 may display the icon 111 above, or to the left or right of, the current location at which the touch-and-drag operation 109 is performed.

If the first gesture has terminated, the controller 401 stops moving the cursor, and displays the cursor moved by the first gesture. For example, if a dragging operation 117 has terminated at the specific location 119, the controller 401 may detect coordinates of the third location 121, corresponding to coordinates of the specific location 119, and display the cursor at the third location 121.

In operation 515, the controller 401 determines whether a second gesture (for example, a touch-and-hold operation) is performed in the keypad display area by the user. If it is determined that the second gesture is performed, the controller 401 proceeds to operation 517, and otherwise, the controller 401 proceeds to operation 507.

In operation 517, the controller 401 switches the text input mode to a text selection mode, and then proceeds to operation 519. The text selection mode is a mode of selecting at least one letter displayed on the text display area and editing the selected letter.

In operation 519, the controller 401 highlights a selection area corresponding to the input location of the second gesture in the text display area, displays first area indicators indicating start and end points of the selection area, and then proceeds to operation 521. In more detail, the controller 401 detects coordinates of the text display area, corresponding to the current coordinates of the second gesture, designates a selection area including at least one letter located at the detected coordinates of the text display area, highlights the designated selection area, and then displays first area indicators for the designated selection area.

In operation 521, the controller 401 displays second area indicators in the keypad display area according to the input location of the second gesture, and then proceeds to operation 523. In more detail, the controller 401 detects the current coordinates of the second gesture, displays second area indicators spaced by a distance between the first area indicators according to the detected current coordinates of the second gesture, and corresponds the first area indicators to the second area indicators, respectively.

For example, if a touch-and-hold operation 211 of touching a specific location and then holding is performed by the user, as illustrated on the screen 209 of FIG. 2, the controller 401 may designate a selection area 215 corresponding to coordinates at which the touch-and-hold operation 211 is performed, in the text display area, highlight the designated selection area 215, and then display first area indicators 217. Also, the controller 401 may display second area indicators 213 spaced by a distance between the first area indicators 217, in the keypad display area, according to the coordinates at which the touch-and-hold operation 211 is performed, and correspond the first area indicators 217 to the second area indicators 213, respectively.

In operation 523, the controller 401 displays a text editing menu, and proceeds to operation 525. The text editing menu is a menu for editing at least one letter included in the selection area 225, and may include various menus, such as copy, paste, select all, etc.

In operation 525, the controller 401 determines whether a third gesture (for example, a drag operation) following the second gesture is performed in the keypad display area by the user. If it is determined that the third gesture is performed, the controller 401 proceeds to operation 527, and otherwise, the controller 401 proceeds to operation 535.

In operation 527, the controller 401 moves one of the second area indicators according to an input location changed by the third gesture, then proceeds to operation 529. In operation 529, the controller 401 moves the first area indicator corresponding to the moved second area indicator among the first area indicators according to the location of the moved second area indicator, highlights a selection area changed by the movement of the first area indicator, and then proceeds to operation 531.

In more detail, the controller 401 detects current coordinates of the third gesture, selects the second area indicator located closest to the current coordinates of the third gesture between the second area indicators, and moves the corresponding second area indicator according to the current coordinates of the third gesture. The controller 401 detects coordinates of the moved second area indicator, detects coordinates of the text display area, corresponding to the coordinates of the second area indicator, moves the first area indicator corresponding to the moved second area indicator to the detected coordinates of the text display area, re-designates a selection area according to the movement of the first area indicator, and highlights the re-designated selection area.

For example, if a drag gesture 221 of dragging in a right direction, following the touch-and-hold operation 211, is performed by the user, as illustrated on the screen 219 of FIG. 2, the controller 401 may move the second area indicator 223 located in the movement direction of the drag operation 221 among the second area indicators 213 by the movement distance of the drag operation 221. The controller 401 may detect coordinates of the moved second area indicator 223, move the first area indicator 227 corresponding to the second area indicator 223 to coordinates of the text display area, corresponding to the coordinates of the second area indicator 223, and highlight a selection area 225 changed by the movement of the first area indicator 227.

In operation 531, the controller 401 determines whether the third gesture (for example, a drag operation) has terminated. If it is determined that the third gesture has terminated, the controller 401 proceeds to operation 533, and otherwise, the controller 401 proceeds to operation 535.

In operation 533, the controller 401 displays a text editing menu, and then proceeds to operation 535. For example, if the touch-and-drag operation 221 has terminated, the controller 401 may display a text editing menu 231 in the keypad display area, as illustrated on the screen 229 of FIG. 2.

In operation 535, the controller 401 determines whether one of the second area indicators 213 is touched and dragged by the user. If a drag operation of dragging one of the second indicators 213 is performed, the controller 401 proceeds to operation 537, and otherwise, the controller 401 proceeds to operation 545.

In operation 537, the controller 401 moves the dragged second indicator according to a location at which the drag operation is currently performed, and then proceeds to operation 539. In operation 539, the controller 401 moves the first area indicator corresponding to the dragged second area indicator among the first area indicators in consideration of the location of the dragged second area indicator, highlights a selection area changed by the movement of the first area indicator, and then, proceeds to operation 541.

For example, if one of the second area indicators is dragged in operation 303 from the first location 305 to the second location 307, the controller 401 may move the first area indicator corresponding to the dragged second area indicator from the third location 309 to the fourth location 311, and highlight a selection area changed by the movement of the first area indicator.

In operation 541, the controller 401 determines whether dragging one of the second area indicators has terminated. If operation 303 of dragging the second area indicator has terminated, the controller 401 proceeds to operation 543, and otherwise, the controller 401 proceeds to operation 531. In operation 543, the controller 401 displays a text editing menu, and then proceeds to operation 545. For example, if operation 303 of dragging the second area indicator has terminated, the controller 401 may display a text editing menu 315 in the keypad display area.

In operation 545, the controller 401 determines whether a text selection mode has terminated by the user. If another area except for the text editing menu on the screen is touched, the controller 401 may determine that there is a request for terminating the text selection mode. If there is a request for terminating the test selection mode, the controller 401 proceeds to operation 547, and otherwise, the controller 401 repeatedly performs operation 545.

In operation 547, the controller 401 switches the text selection mode to the text input mode.

Through operations described above, by moving a cursor through a keypad display area in a mobile terminal, user convenience for message editing may be improved. Also, by adjusting a size of a selection area through the keypad display area in the mobile terminal, user convenience for message editing may be further improved.

The method of editing the message in the mobile terminal can be implemented as a computer-readable recording medium encoded with instructions that, when executed, cause a computer to execute the above disclosure. The computer-readable recording medium includes all types of recording media in which computer-readable data are stored. Examples of the computer-readable recording medium include a Read Only Memory (ROM), a Random Access Memory (RAM), an optical disk, a magnetic tape, a floppy disk, a hard disk, and a non-volatile memory. In addition, the computer-readable recording medium may be distributed to computer systems over a network, in which computer-readable code may be stored and executed in a distributed manner.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile terminal comprising:
   a touchscreen display;
   a processor coupled to the touchscreen display; and
   a memory coupled to the processor,
   wherein the memory stores instructions that, when executed by the processor, cause the mobile terminal to:
   display a user interface for receiving text input on the touchscreen display, wherein the user interface includes a first region displaying one or more texts and a second region displaying a virtual keyboard including keys,
   receive a first touch input through one of the keys in the second region, wherein the first touch input is a single touch input of a first type,
   in response to the first touch input, input at least one of a letter, a number, or a special character on a position corresponding to a cursor displayed in the first region, the cursor indicating a current location of a text selection or an input in the displayed one or more texts in the first region,
   receive a first drag input moving from a first point to a second point over the virtual keyboard in the second region,
   move the cursor from a third point to a fourth point in the displayed one or more texts in the first region in response to the first drag input, wherein movement of the cursor from the third point to the fourth point in the displayed one or more texts corresponds to movement of the first drag input from the first point to the second point over the virtual keyboard, receive a second touch input in the second region displaying the virtual keyboard, wherein the second touch input is a single touch input of a second type which is different from the first type, select, among the one or more texts displayed in the first region, at least one first text corresponding to a location at which the second touch input is performed in the second region displaying the virtual keyboard, in response to the second touch input, receive a second drag input moving the second touch input from a fifth point to a sixth point in the second region displaying the virtual keyboard while maintaining the second touch input, select at least one second text between a seventh point and an eighth point in the first region, in response to the second drag input, wherein the selected at least one second text corresponds to the second drag input, and the selected at least one second text includes the selected at least one first text, and after the second drag input is finished, display a text editing menu for the selected at least one second text.

2. The mobile terminal of claim 1, wherein a direction from the third point to the fourth point corresponds to a direction from the first point to the second point.

3. The mobile terminal of claim 2, wherein a distance from the third point to the fourth point corresponds to a distance from the first point to the second point.

4. The mobile terminal of claim 1,
wherein the instructions further cause the processor to:
in response to the first touch input, display an enlarged key representing the one of the keys over or near the one of the keys in the second region, and
wherein the enlarged key is not displayed during the first drag input after the first touch input.

5. The mobile terminal of claim 1, wherein the first drag input traverses a plurality of keys on the virtual keyboard in the second region.

6. The mobile terminal of claim 1, wherein the instructions further cause the processor to:
input at least one of a letter, a number, or a special character in the first region, in response to the first touch input and a release of the first touch input; and
move the cursor in the first region, in response to a drag input on maintaining the first touch input.

7. The mobile terminal of claim 1, wherein the touchscreen display is configured to display a specific representation indicating an input for controlling the cursor.

8. The mobile terminal of claim 1, wherein the first drag input comprises moving the first touch input while maintaining the first touch input.

9. The mobile terminal of claim 1, wherein the at least one first text includes a word.

10. A method of editing text in a mobile terminal, the method comprising:
displaying a user interface for receiving text input on a touchscreen display of the mobile terminal, wherein the user interface includes a first region displaying one or more texts and a second region displaying a virtual keyboard including keys;
receiving a first touch input through one of the keys in the second region, wherein the first touch input is a single touch input of a first type;
in response to the first touch input, receiving an input of at least one of a letter, a number, or a special character on a position corresponding to a cursor displayed in the first region, the cursor indicating a current location of a text selection or an input in the displayed one or more texts in the first region;
receiving a first drag input moving from a first point to a second point over the virtual keyboard in the second region;
moving the cursor from a third point to a fourth point in the displayed text in the first region in response to the first drag input, wherein movement of the cursor from the third point to the fourth point in the displayed one or more texts corresponds to movement of the first drag input from the first point to the second point over the virtual keyboard;
receiving a second touch input in the second region displaying the virtual keyboard, wherein the second touch input is a single touch input of a second type which is different from the first type;
selecting, among the one or more texts displayed in the first region, at least one first text corresponding to a location at which the second touch input is performed in the second region displaying the virtual keyboard, in response to the second touch input;
receiving a second drag input moving the second touch input from a fifth point to a sixth point in the second region displaying the virtual keyboard while maintaining the second touch input;
selecting at least one second text between a seventh point and an eighth point in the first region, in response to the second drag input, wherein the selected at least one text corresponds to the second drag input, and the selected at least one second text includes the selected at least one first text; and
after the second drag input is finished, displaying a text editing menu for the selected at least one second text.

11. The method of claim 10, wherein a direction from the third point to the fourth point corresponds to a direction from the first point to the second point.

12. The method of claim 11, wherein a distance from the third point to the fourth point corresponds to a distance from the first point to the second point.

13. The method of claim 10, further comprising:
in response to the first touch input, displaying an enlarged key representing the one of the keys over or near the one of the keys in the second region,
wherein the enlarged key is not displayed during the first drag input after the first touch input.

14. The method of claim 10, wherein the first drag input traverses a plurality of keys on the virtual keyboard in the second region.

15. The method of claim 10, further comprising:
inputting at least one of a letter, a number, or a special character in the first region, in response to the first touch input and a release of the first touch input; and
moving the cursor in the first region, in response to a drag input on maintaining the first touch input.

16. The method of claim 10, further comprising displaying, on the touchscreen display, a specific representation indicating an input for controlling the cursor.

17. The method of claim 10, wherein the first drag input comprises moving the first touch input while maintaining the first touch input.

18. The method of claim 10, wherein the at least one first text includes a word.

* * * * *